United States Patent
Bodamer et al.

(10) Patent No.: US 9,690,811 B1
(45) Date of Patent: Jun. 27, 2017

(54) SINGLE REPOSITORY MANIFESTATION OF A MULTI-REPOSITORY SYSTEM

(75) Inventors: Roger Bodamer, San Carlos, CA (US); Ziyad Mohammad Dahbour, San Mateo, CA (US); Bruce Alec Templeton, Bondi Beach (AU); Richard Ira Butterfield, Chico, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 2698 days.

(21) Appl. No.: 10/982,184

(22) Filed: Nov. 5, 2004

Related U.S. Application Data

(63) Continuation-in-part of application No. 10/734,705, filed on Dec. 12, 2003, now abandoned.

(60) Provisional application No. 60/517,840, filed on Nov. 5, 2003.

(51) Int. Cl.
*G06F 17/30* (2006.01)

(52) U.S. Cl.
CPC .............. *G06F 17/30306* (2013.01)

(58) Field of Classification Search
CPC .............................................. G06F 17/30306
USPC ................................................. 707/100, 781
See application file for complete search history.

(56) References Cited

U.S. PATENT DOCUMENTS

| | | | |
|---|---|---|---|
| 5,664,187 A * | 9/1997 | Burkes et al. | 711/114 |
| 5,860,116 A * | 1/1999 | Washington | 711/148 |
| 5,873,085 A * | 2/1999 | Enoki et al. | |
| 5,873,088 A * | 2/1999 | Hayashi et al. | 707/100 |
| 5,974,407 A * | 10/1999 | Sacks | 707/2 |
| 6,014,656 A | 1/2000 | Hallmark et al. | |
| 6,058,267 A * | 5/2000 | Kanai et al. | 712/28 |
| 6,330,555 B1 * | 12/2001 | Weber | 707/2 |
| 6,516,337 B1 | 2/2003 | Tripp et al. | |
| 6,604,100 B1 | 8/2003 | Fernandez et al. | |
| 6,636,845 B2 | 10/2003 | Chau et al. | |
| 6,809,976 B2 * | 10/2004 | Ooishi | 365/158 |
| 6,917,944 B1 | 7/2005 | Prasad et al. | |

(Continued)

OTHER PUBLICATIONS

Sinha et al., "The Galaxy Distributed Operating System", IEEE, 1991.*

(Continued)

*Primary Examiner* — Shew-Fen Lin
(74) *Attorney, Agent, or Firm* — Hewlett Packard Enterprise Patent Department

(57) ABSTRACT

Techniques are provided for manifesting a multiple repository system as a single repository to an application that is designed to use a single repository. According to one aspect, a particular container, which is used by the application to store data, is identified. One or more additional containers are created in one or more different repositories. Each of the additional containers is formatted to store the data that the application stores in the particular container. A construct is created. The construct is associated with the particular container's identifier. The construct causes information from the particular container and each of the additional containers to be combined to answer database commands that reference the particular container's identifier. As a result, data stored in a single repository can be distributed among multiple repositories, and the unmodified application can continue to access that data as though the data was stored in the single repository.

20 Claims, 6 Drawing Sheets

(56) References Cited

U.S. PATENT DOCUMENTS

| | | | |
|---|---|---|---|
| 6,925,515 B2 | 8/2005 | Burns et al. | |
| 6,941,432 B2 * | 9/2005 | Ronstrom | 711/165 |
| 7,028,216 B2 * | 4/2006 | Aizawa et al. | 714/6.32 |
| 7,043,506 B1 | 5/2006 | Horvitz | |
| 7,085,087 B2 * | 8/2006 | Fukuhisa et al. | 360/55 |
| 2001/0013087 A1 * | 8/2001 | Ronstrom | 711/133 |
| 2002/0152210 A1 * | 10/2002 | Johnson et al. | 707/9 |
| 2002/0184401 A1 | 12/2002 | Kadel et al. | |
| 2003/0004947 A1 | 1/2003 | Coverston | |
| 2003/0065659 A1 | 4/2003 | Agarwal et al. | |
| 2003/0093647 A1 * | 5/2003 | Mogi et al. | 712/1 |
| 2003/0140308 A1 | 7/2003 | Murthy et al. | |
| 2004/0017718 A1 * | 1/2004 | Ooishi | 365/210 |
| 2004/0064466 A1 | 4/2004 | Manikutty et al. | |
| 2004/0088359 A1 | 5/2004 | Simpson | |
| 2004/0088415 A1 | 5/2004 | Chandrasekar et al. | |
| 2004/0098363 A1 * | 5/2004 | Anglin et al. | 707/1 |
| 2004/0103245 A1 * | 5/2004 | Fukusawa et al. | 711/113 |
| 2004/0133609 A1 * | 7/2004 | Moore et al. | 707/200 |
| 2004/0225659 A1 | 11/2004 | O'Brien et al. | |
| 2005/0071379 A1 | 3/2005 | Kekre et al. | |
| 2005/0114728 A1 * | 5/2005 | Aizawa et al. | 714/6 |

OTHER PUBLICATIONS

Josephine Cheng, et al., "IBM DB2 XML Extender, An end-to-end solution for storing and retrieving XML documents," IEEE, ICDE '00 Conference, San Diego, Feb. 2000, 128 pages.

Jim Melton, "ISO-ANSI Working Draft, XML-Related Specifications (SQL/XML)," WG3: DRS-020, H2-2002-365, Aug. 2002, 154 pages.

Oracle Corporation, "Oracle9i XML Database Developer's Guide—Oracle XML DB," Release 2 (9.2), Mar. 2002, Part No. A96620-1, pp. 4-31-4-35, 5-21-5-24 and 5-70-5-71.

W3C, "XML Schema Part 1: Structures," W3C Recommendation, May 2, 2001, http://www.w3.org/TR/2001/REC-xmlschema-1-20010502/, pp. 1-203.

W3C, "XML Schema Part 2: Datatypes," W3C Recommendation, May 2, 2001, http://www.w3.org/TR/2001/REC-xmlschema-2-20010502/, pp. 1-146.

* cited by examiner

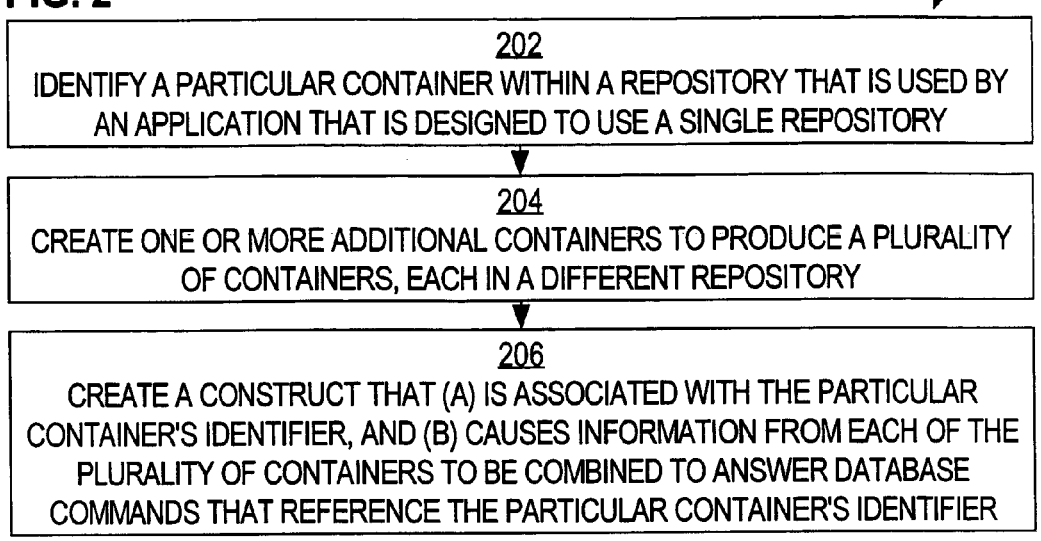
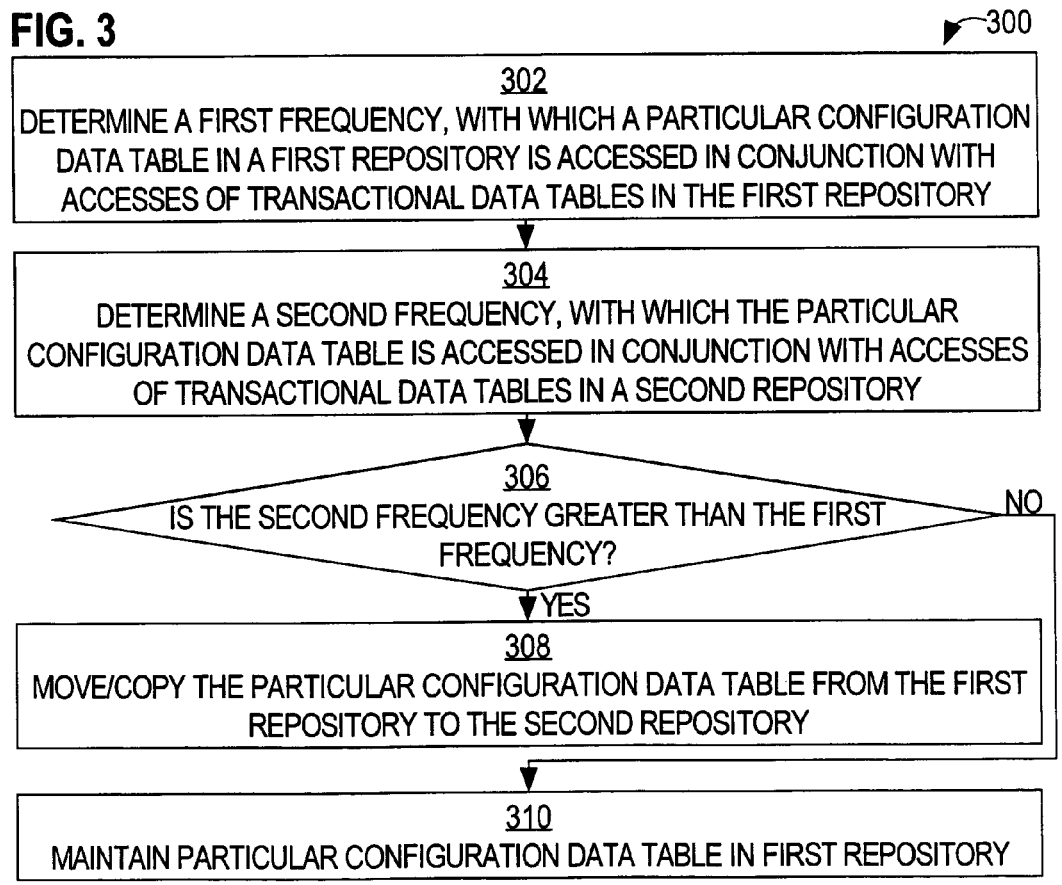

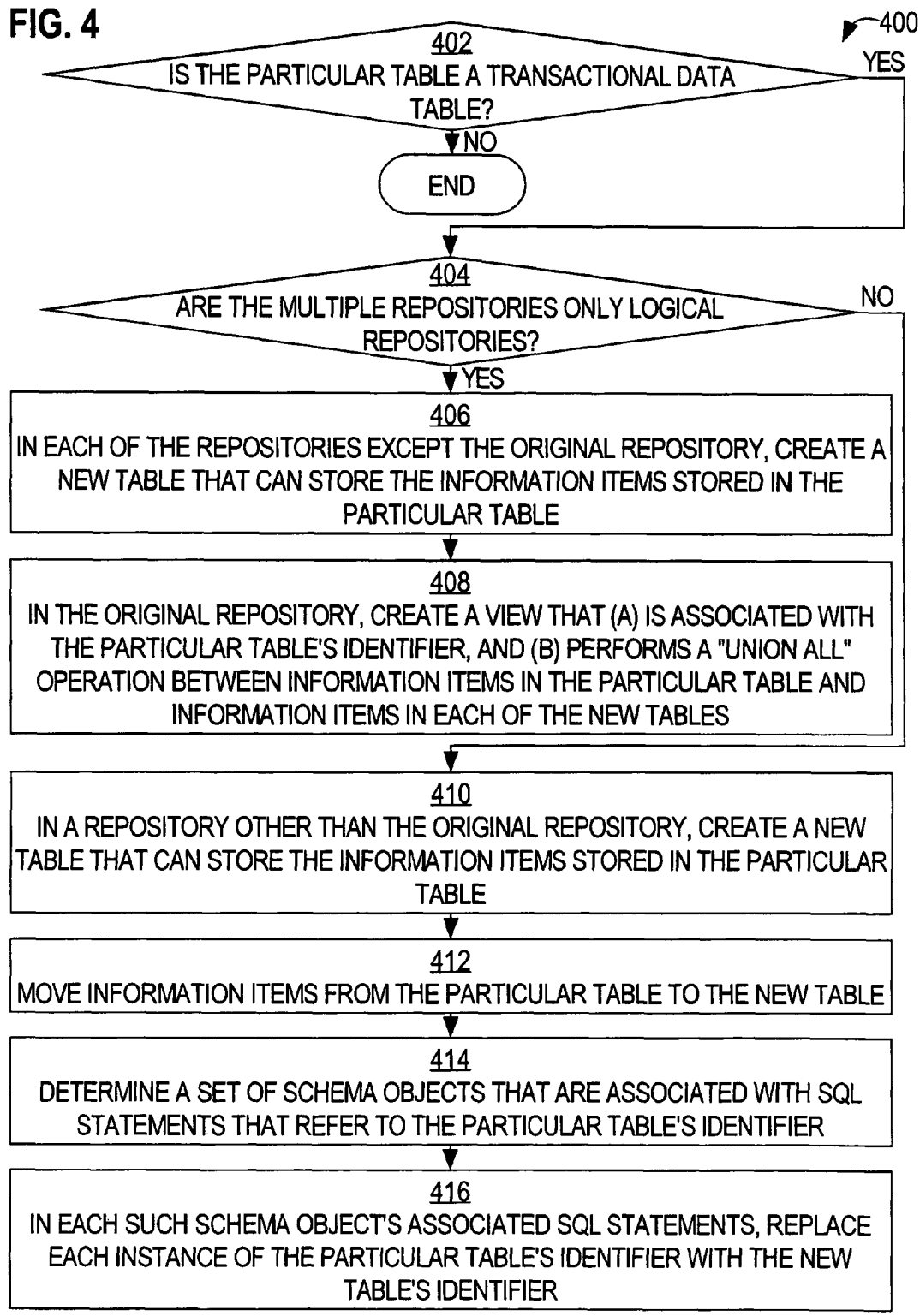

SINGLE REPOSITORY MANIFESTATION OF A MULTI-REPOSITORY SYSTEM

CLAIM OF PRIORITY

The present application claims priority to U.S. Provisional Patent Application No. 60/517,840, entitled "APPLICATION DATA LIFECYCLE MANAGEMENT", filed Nov. 5, 2003, the contents of which are hereby incorporated by reference in their entirety for all purposes as if fully set forth herein.

The present application is a continuation-in-part of U.S. patent application Ser. No. 10/734,705, entitled "TYPE-SPECIFIC METADATA FOR ACTIVE/INACTIVE REPOSITORY SYSTEM", filed Dec. 12, 2003 now abandoned, the contents of which are hereby incorporated by reference in their entirety for all purposes as if fully set forth herein.

The present application is related to U.S. patent application Ser. No. 10/982,185, entitled "PARTITION-BASED TRANSPARENCY LAYER", filed on the same date herewith, the contents of which are hereby incorporated by reference in their entirety for all purposes as if fully set forth herein.

FIELD OF THE INVENTION

The present invention relates to data repository systems, and in particular, to manifesting multiple data repositories as a single data repository.

BACKGROUND OF THE INVENTION

In this information age, businesses and other organizations regularly deal with large quantities of data. In order to access this data rapidly, organizations typically store the data in a computer-managed data repository such as a database or file system. A discrete unit of data stored in a repository may be referred to as an "information item." For example, a business may store, in a database, information items related to purchase orders received from customers. When information about a particular purchase order should be updated, the information item corresponding to the particular purchase order may be selected and updated in the repository. For example, at the time a customer's order is shipped, the information item corresponding to the order may be updated to indicate a date and tracking number corresponding to the shipment.

As time goes by, the quantity of data stored by an organization tends to grow. For example, as customers place more and more orders with a business, the business typically stores more and more purchase order information items in its repository. As the amount of data in a repository increases, the performance of the repository decreases. For example, a query performed on a database with many information items typically takes longer to complete than the same query performed on a database with few information items. The quantity of data in a repository also influences the time required to backup the data within the repository and the time required to recover such data should a fault occur relative to the repository.

By moving data from a first repository to a second repository, the quantity of data stored in the first repository may be maintained at a manageable size. However, application programs ("applications") that access the data might still need to access data that has been moved out of the first repository, as well as data that has been retained in the first repository. Many applications might not be designed or configured to access data in multiple repositories. If an application is configured to access only a single repository, and the data needed by that application has been moved to another, different repository, then the application may fail to find some or all of the data that the application needs. This can lead to unexpected and incorrect results.

One possible solution might be to modify existing applications so that those applications are able to access multiple repositories. Unfortunately, such modification can be expensive and time-consuming. Businesses that have already spent considerable resources in acquiring, installing, and using existing applications are often loath to expend additional resources to acquire, install, and use revised editions of those applications. Additionally, it can be difficult for application programmers to foresee and address all of the many different repository system configurations that an application might encounter. End users of applications typically would rather not be forced to specially configure those applications to work with their specific repository system configurations. Thus, a technique that overcomes the limitations of prior approaches to accessing data distributed among multiple data repositories is needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF THE INVENTION

Techniques are provided for manifesting multiple data repositories as a single data repository to an application that is designed to use a single repository rather than multiple data repositories. According to one aspect, a particular container, which is used by the application to store data, is identified. One or more additional containers are created, thereby producing a plurality of containers for storing the data that the application is designed to store in the particular container. The containers are created in different repositories, so that each of the containers belongs to a different repository within a plurality of repositories. A construct is created that (a) is associated with the particular container's identifier and (b) causes information from each of the plurality of containers to be combined to answer database commands that reference the particular container's identifier. As a result, data stored in a single repository can be distributed among multiple repositories, and the unmodified application can continue to access that data as though the data were stored in the single repository. Thus, the construct may be viewed as a "transparency layer" that causes the plural nature of the repository system to be transparent to the application.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flow diagram that illustrates a technique for converting a single repository system into a multiple repository system that is manifested as a single repository system, according to one embodiment of the invention;

FIG. 3 is a flow diagram that illustrates a technique for selectively copying or moving configuration data tables from one repository to another repository, according to one embodiment of the invention;

FIG. 4 is a flow diagram that illustrates a more detailed technique for converting a single repository system into a multiple repository system that is manifested as a single repository system, according to one embodiment of the invention.

DETAILED DESCRIPTION OF THE INVENTION

Techniques and systems are provided for manifesting multiple data repositories as a single data repository. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Structural Overview

Figure 1A:
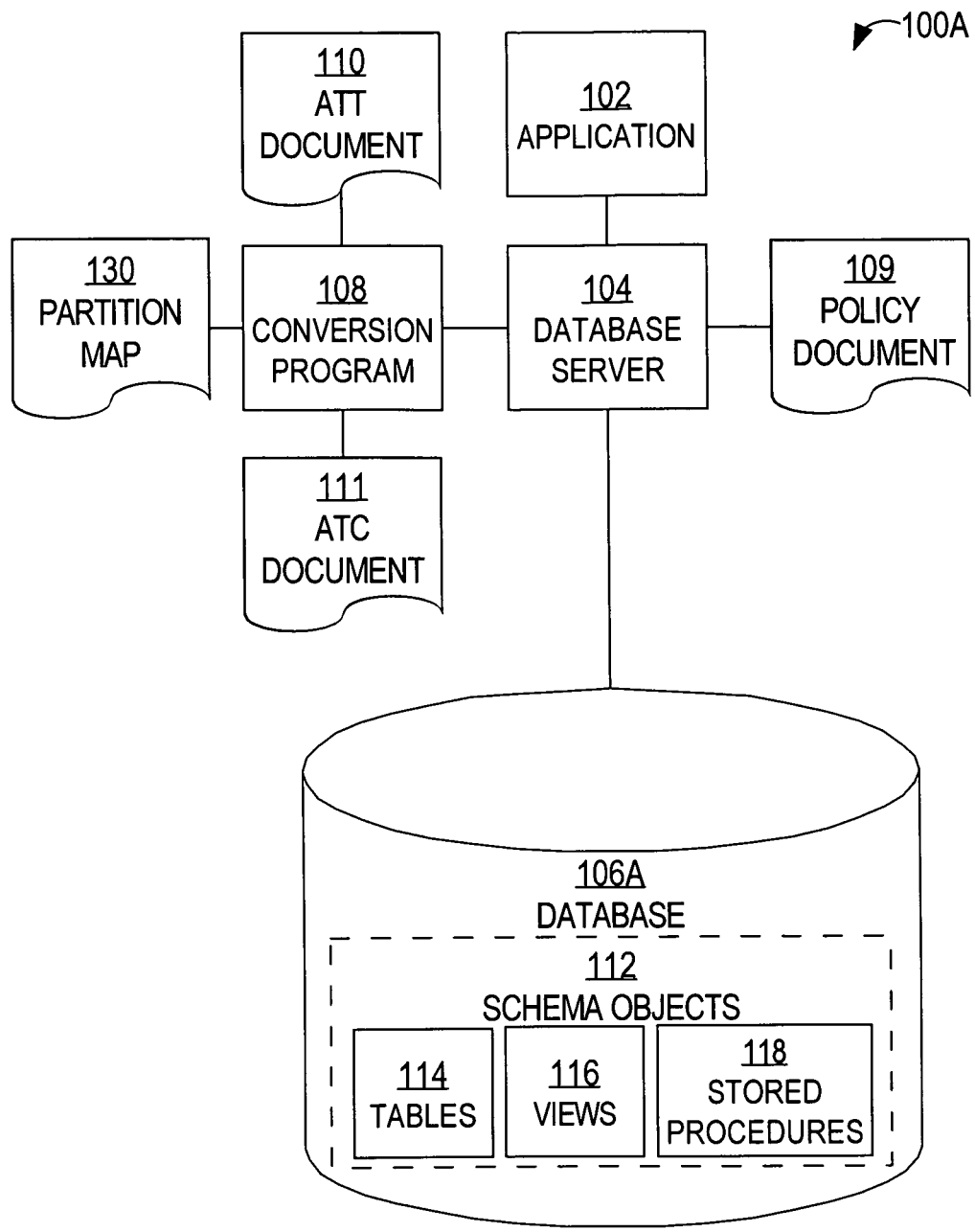
FIG. 1A is a block diagram of a single repository system that may be converted automatically into a multiple repository system that is manifested to an application as a single repository, according to one embodiment of the invention.

FIG. 1A is a block diagram of a single repository system 100A that may be converted automatically into a multiple repository system that is manifested to an application as a single repository, according to one embodiment of the invention. System 100A comprises an application 102, a database server 104, a database 106A, a conversion program 108, an application transaction type (ATT) document 110, an application transaction constraint (ATC) document 111, a policy document 109, and a partition map 130. Typically, application 102, database server 104, and conversion program 108 execute on computer systems.

"Repositories" may be physical in nature or logical in nature. In some circumstances, logical repositories correspond to physical repositories. In other circumstances, a physical repository contains multiple logical repositories. In FIG. 1A, database 106A is both a logical and a physical repository. Database 106A stores schema objects 112. Schema objects 112 conform to a defined schema. Schema objects 112 include tables 114, views 116, and stored procedures 118. Each of schema objects 112 may be associated with a separate identifier. A schema object's identifier may be used to refer to the schema object.

Tables 114 are containers that store information items. More specifically, tables 114 are relational tables that may comprise multiple rows and columns. Views 116 are logical tables based on one or more tables or views. Views 116 include sets of criteria that describe subsets of information items that are stored in tables 114 and/or described by others of views 116. For example, given a table DEPT_A and a table DEPT_B, a view DEPT_VIEW might describe a subset of information items that satisfy a SQL statement "SELECT * FROM DEPT_A, DEPT_B WHERE DEPT_A.NUM=DEPT_B.NUM". When the contents of either DEPT_A or DEPT_B are modified, DEPT_VIEW automatically reflects the modification. Views 116 do not store any information items per se.

Stored procedures 118 include one or more commands that may be executed to retrieve and/or manipulate data stored in database 106A. For example, stored procedures 118 may include one or more sequences of SQL statements that may specify operations to be performed relative to tables 114 and/or views 116.

Application 102 is configured to issue commands to database server 104. Database server 104 executes such commands to manipulate data stored in database 106A and/or to retrieve data stored in database 106A and return the retrieved data to application 102. For example, to cause all information items stored in table DEPT_A to be retrieved and returned, application 102 might issue, to database server 104, a SQL query "SELECT * FROM DEPT_A".

ATT document 110 describes the structure of information items contained in repositories. ATT document 110 describes relationships between various ones of schema objects 112. For example, if a first table contains rows for "purchase order headers" and a second table contains rows for "purchase order lines," then ATT document 110 may indicate how the purchase order headers in the first table are related to the purchase order lines in the second table. For each of schema objects 112, ATT document 110 may indicate whether that schema object contains "transactional" data or "configuration" data. The difference between transactional data and configuration data is described below in the section titled "DETERMINING WHETHER TO COPY OR MOVE CONFIGURATION DATA".

ATC document 111 describes a set of categorization criteria that an information item defined by ATT document 110 needs to satisfy in order for that information item's status to change (e.g., from "active" to "inactive"), according to the manner discussed in U.S. patent application Ser. No. 10/734,705, entitled "TYPE-SPECIFIC METADATA FOR ACTIVE/INACTIVE REPOSITORY SYSTEM", filed Dec. 12, 2003. According to one embodiment, an information item's status indicates to which of several repositories the information item is to be moved, if the information item is not already in that repository.

Policy document 109 describes a set of relocation criteria that, when satisfied, will cause to be moved, to a different repository, an information item whose status indicates that the information is to be moved to the different repository, according to the manner discussed in U.S. patent application Ser. No. 10/734,705, entitled "TYPE-SPECIFIC METADATA FOR ACTIVE/INACTIVE REPOSITORY SYSTEM", filed Dec. 12, 2003.

Converting to a Multi-Repository System

Conversion program 108 converts a single-repository system to a multi-repository system in a manner that renders the conversion transparent to applications that are designed to access the single-repository system. Specifically, when executed, conversion program 108 receives, as input, ATT document 110 and partition map 130. Partition map 130 is data that describes how many repositories will be in the multiple repository system. Partition map 130 may indicate whether the repositories are physical in nature or only logical in nature. Partition map 130 also prevents namespace collisions by making each repository a separately identifiable entity.

According to one embodiment, based solely on ATT document 110 and partition map 130, conversion program 108 automatically creates additional schema objects and automatically modifies existing schema objects as described below in order to allow application 102 to interact with a multiple repository system as though the multiple repository system were a single repository system. Conversion program 108 may create and modify schema objects, for example, by issuing commands to database server 104.

Figure 1B:
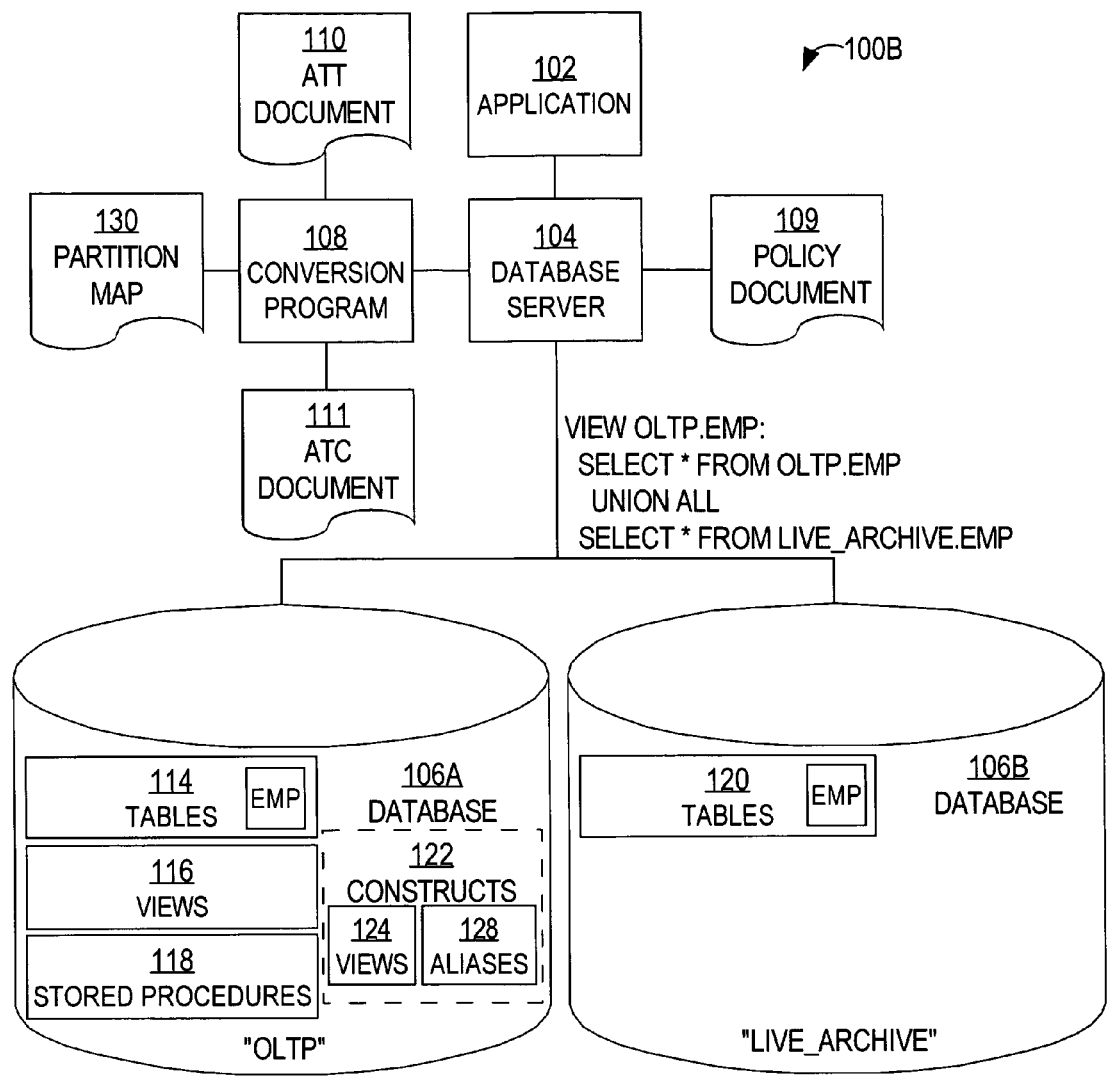
FIG. 1B is a block diagram of a multiple physical repository system that is manifested to an application as a single repository, according to one embodiment of the invention.

As shall be described in greater detail hereafter, after the conversion is performed, the multi-repository system includes constructs that cause the multi-repository system to manifest itself as a single repository system to applications designed to interact with single-repository systems. For example, FIG. 1B is a block diagram of a multiple physical repository system 100B that is manifested to an application as a single repository, according to one embodiment of the invention. According to techniques described herein, system 100A may be converted automatically into system 100B. Like system 100A, system 100B comprises application 102, database server 104, conversion program 108, ATT document 110, and partition map 130. However, where system 100A comprised single database 106A, system 100B comprises multiple databases 106A and 106B.

In FIG. 1B, both database 106A and database 106B are separate logical and physical repositories. Database 106A contains tables 114 and database 106B contains tables 120. Database 106A also contains transparency layer constructs 122. Conversion program 108 automatically creates transparency layer constructs 122 and tables 120. Transparency layer constructs 122 comprise views 124 and aliases 128. Views 124 describe unions of certain ones of tables 114 and tables 120. Aliases 128 are references, or "pointers" to certain ones of tables 120. Aliases 128 may include references to remote objects, such as information items that are stored in remote databases in a distributed database environment.

Views 124 and aliases 128 may be associated with identifiers that, prior to the conversion, were associated with one or more of tables 114 of the single-repository system. Because application 102 is designed to interact with a single repository, commands that application 102 issues to database server 104 refer only to identifiers of schema objects that are contained in database 106A prior to the conversion. However, as shall be explained in greater detail hereafter, because the transparency layer constructs 122 are also associated with those identifiers, the commands are executed against schema objects contained in database 106B, either instead of or in addition to schema objects contained in database 106A.

For example, tables 114 may comprise a table that is associated with identifier EMP, and tables 120 may comprise a table, created during the conversion, that is also associated with identifier EMP. Database 106 A may be associated with an identifier OLTP, and database 106B may be associated with an identifier LIVE_ARCHIVE. Thus, using namespace conventions, table EMP in tables 114 may be referred to as OLTP.EMP, and table EMP in tables 120 may be referred to as LIVE_ARCHIVE.EMP. Information items that were formerly contained only in table OLTP.EMP may have been distributed, during or after the conversion, among table OLTP.EMP and table LIVE_ARCHIVE.EMP. Views 124 may comprise a view, created during the conversion, that is also associated with OLTP.EMP. View OLTP.EMP may include a SQL statement "SELECT * FROM OLTP.EMP UNION ALL SELECT * FROM LIVE_ARCHIVE.EMP". The execution of this statement causes all information items from table OLTP.EMP and all information items from table LIVE_ARCHIVE.EMP to be retrieved, combined (preserving duplicates), and returned. Thus, after the conversion, when application 102 references a schema object associated with the OLTP.EMP identifier, the application receives results from both table OLTP.EMP and table LIVE_ARCHIVE.EMP. Application 102 does not need to be aware of the fact that database 106A and database 106B are separate physical repositories.

For another example, tables 120 may comprise a table, created during the conversion, which is associated with identifier PO. According to the namespace conventions discussed above, this table may be referred to as table LIVE_ARCHIVE.PO. Table LIVE_ARCHIVE.PO might contain information items that formerly were contained in a table OLTP.PO (which existed in database 106A prior to the conversion). Aliases 128 may comprise an alias or synonym that is also associated with OLTP.PO. The alias associated with OLTP.PO may refer to table LIVE_ARCHIVE.PO in database 106B. As a result, database commands that contain references to identifier OLTP.PO are automatically converted to contain references to the identifier for table LIVE_ARCHIVE.PO. Consequently, application 102 does not need to be aware that table LIVE_ARCHIVE.PO in database 106B has effectively replaced original table OLTP.PO in database 106A.

In the embodiment described above, views and stored procedures are stored in database 106A but not database 106B. However, in one embodiment, views and/or stored procedures also may be stored in and/or duplicated in database 106B for performance and/or other reasons.

In the embodiment described above, "UNION ALL" select statements are used to implement a transparency layer that causes multiple repositories to be accessible to an application as though those multiple repositories were a single repository. However, in alternative embodiments, such as an embodiment described in U.S. patent application No. 10/982,185, entitled "PARTITION-BASED TRANSPARENCY LAYER", filed on the same date herewith, other techniques may be used to implement a transparency layer.

Multiple Logical Repositories

Figure 1C:
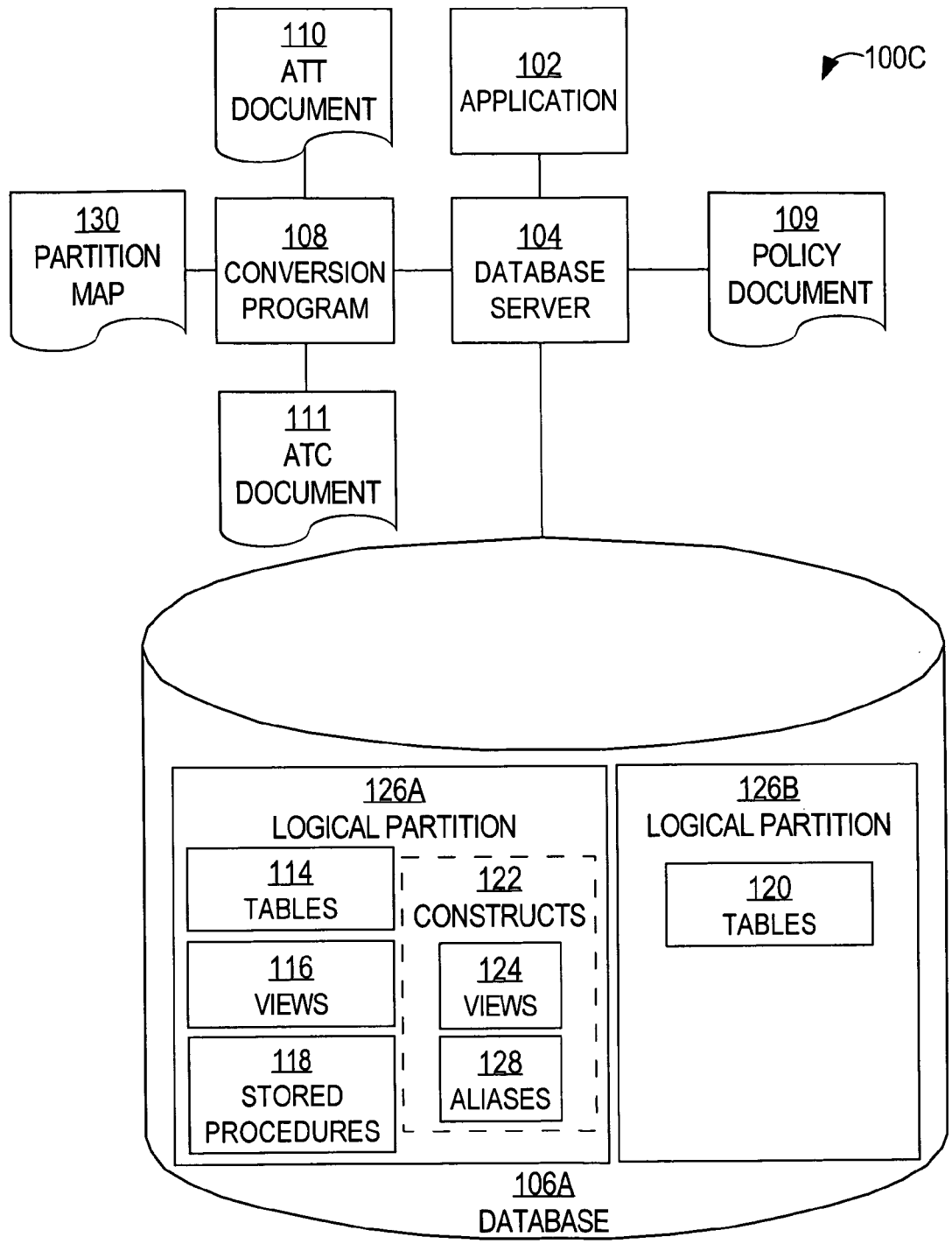
FIG. 1C is a block diagram of a multiple logical repository system that is manifested to an application as a single repository, according to one embodiment of the invention.

FIG. 1C is a block diagram of a multiple logical repository system 100C that is manifested to an application as a single repository, according to one embodiment of the invention. According to techniques described herein, system 100A may be converted automatically into system 100C. Like system 100A, system 100C comprises application 102, database server 104, database 106A, conversion program 108, ATT document 110, and partition map 130. However, unlike in system 100A, database 106A in system 100C comprises multiple logical repositories 126A and 126B. Each of logical repositories 126A and 126B may correspond to a different database schema. By structuring the repositories as logical repositories rather than physical repositories, complications that can arise in distributed database systems can be avoided. For example, by structuring the repositories as logical repositories, the need to perform a two-phase commit among multiple distributed databases can be avoided. Also, caches local to the logical repositories may be used.

In FIG. 1C, both repositories 126A and 126B are separate logical repositories within a single physical repository (i.e.

database 106A). Logical repository 126A contains tables 114 and logical repository 126B contains tables 120. Logical repository 126A also contains transparency layer constructs 122. Transparency layer constructs 122 comprise views 124 and aliases 128. As in system 100B, views 124 describe unions of certain ones of tables 114 and tables 120, and aliases 128 are references, or "pointers" to certain ones of tables 120.

Similar to the views described with reference to system 100B, views 124 and aliases 128 may be associated with identifiers that, prior to the conversion, were associated with one or more of tables 114. Commands that application 102 issues to database server 104 refer only to identifiers that, prior to the conversion, were associated with schema objects that were contained in logical repository 126A. However, after the conversion, the fact that the transparency layer constructs 122 are also associated with those identifiers causes the commands to be executed against schema objects contained in logical repository 126B, either instead of or in addition to schema objects contained in logical repository 126A. Application 102 does not need to be aware of the fact that logical repository 126B exists, or that logical repository 126A and logical repository 126B are separate logical repositories.

Thus, in both system 100B and system 100C, transparency layer constructs 122 function as a "transparency layer" that causes multiple repositories to be manifested to application 102 as a single repository. Consequently, application 102 does not need to be modified to access multiple repositories. Techniques for converting system 100A into system 100B or system 100C are described in further detail below.

In the embodiment described above, views and stored procedures are stored in logical partition 126A but not logical partition 126B. However, in one embodiment, views and/or stored procedures also may be stored in and/or duplicated in logical partition 126B for performance and/or other reasons.

The Conversion Operation

FIG. 2 is a flow diagram that illustrates a technique 200 for converting a single repository system into a multiple repository system that is manifested as a single repository system, according to one embodiment of the invention. Technique 200 may be performed by any of a variety of mechanisms. For example, conversion program 108 may perform technique 200.

In block 202, a particular container is identified within a repository that is used by an application that is designed to use a single repository. The particular container is used by the application to store data. The particular container is associated with a particular identifier. For example, conversion program 108 may identify, within database 106A, a table that application 102 uses to store data. The table may be associated with an identifier OLTP.EMP, for example.

In block 204, one or more additional containers are created, thereby producing a plurality of containers for storing the data that the application is designed to store in the particular container. The containers are created in different repositories, so that each of the containers belongs to a different repository within a plurality of repositories. For example, conversion program 108 may create, within database 106B, a table that is associated with an identifier LIVE_ARCHIVE.EMP. As a result, table OLTP.EMP is contained in database 106A, and table LIVE_ARCHIVE.EMP is contained in database 106B. Conversion program 108 may format table LIVE_ARCHIVE.EMP so that table LIVE_ARCHIVE.EMP can store the same type of information items that application 102 stores in table OLTP.EMP.

In block 206, a construct is created that (a) is associated with the particular identifier and (b) causes information from each of the plurality of containers to be combined to answer database commands that reference the particular identifier. For example, conversion program 108 may create, within database 106A, a view that is associated with identifier OLTP.EMP. Because the view is associated with the identifier OLTP.EMP, database commands that are issued from application 102 and which refer to identifier OLTP.EMP cause view OLTP.EMP to be accessed rather than table OLTP.EMP. Assuming that database 106B is associated with an identifier LIVE_ARCHIVE, view OLTP.EMP may contain a SQL statement such as "SELECT * FROM OLTP.EMP UNION ALL SELECT * FROM LIVE_ARCHIVE. EMP". When executed, this SQL statement causes a "union all" operation to be performed between information items stored in table OLTP.EMP and table LIVE_ARCHIVE.EMP. The results of the operation are used wherever the results of an operation relative to table OLTP.EMP would have been used if not for the existence of view OLTP.EMP.

For another example, conversion program 108 may create, within database 106A, an alias that is associated with identifier OLTP.EMP. Because the alias is associated with the identifier OLTP.EMP, database commands that are issued from application 102 and which reference identifier OLTP.EMP cause alias OLTP.EMP to be accessed. Alias OLTP.EMP may contain a reference or "pointer" to table LIVE_ARCHIVE.EMP. Conversion program 108 may move all information contained in table OLTP.EMP to table LIVE_ARCHIVE.EMP, and may even drop the original OLTP.EMP table. As a result, the results obtained from table LIVE_ARCHIVE.EMP are used wherever the results of an operation relative to table OLTP.EMP would have been used, if not for the existence of alias OLTP.EMP.

After the multiple repository system has been established, information items may be copied or moved between the repositories according to techniques discussed in U.S. patent application Ser. No. 10/734,705, entitled "TYPE-SPECIFIC METADATA FOR ACTIVE/INACTIVE REPOSITORY SYSTEM", filed Dec. 12, 2003. The categorization criteria indicated in ATC document 111 and the relocation criteria indicated in policy document 109 may be used to determine to which repository each information item should be moved, and when each information should be moved, respectively.

Converting Existing Views and Existing Stored Procedures

As described above, one way that a single repository manifestation of a multiple repository system may be achieved involves creating, in an original repository such as database 106A or logical repository 126A, aliases to tables in another repository, such as database 106B or logical repository 126B. For example, an alias OLTP.PO in database 106A may refer to a table LIVE_ARCHIVE.PO in database 106B, and table LIVE_ARCHIVE.PO may store information items that formerly were stored in a table OLTP.PO in database 106A. Because alias OLTP.PO is associated with the same identifier that was associated with table OLTP.PO, references to identifier OLTP.PO in views and stored procedures are interpreted as references to alias OLTP.PO, which refers to table LIVE_ARCHIVE.PO. Such an "alias technique" may be used when all of a table's information items are to be moved to a table in another repository.

Another technique that may be used under such circumstances involves determining which SQL statements stored in the original repository refer to the table containing information items to be moved (the "old table"), and then modifying all of those SQL statements so that those SQL statements refer to the table in the other repository (the "new table") instead. This "text substitution technique" may be especially useful when a database system does not support alias-like indirection constructs. Using this technique, SQL statements associated with existing views, such as views 116 in database 106A, are modified if those SQL statements refer to the old table. Additionally, SQL statements contained in existing stored procedures, such as stored procedures 118 in database 106A, are modified if those SQL statements refer to the old table.

For example, a view OLTP.DEPT_VIEW might be associated with a SQL statement "SELECT * FROM OLTP.DEPT_A, OLTP.DEPT_B WHERE OLTP.DEPT_A.NUM= OLTP.DEPT_B.NUM". Using the technique just described, if all information items stored in old table OLTP.DEPT_A are to be moved to a new table LIVE_ARCHIVE.DEPT_A, then, in the SQL statement associated with view OLTP.DEPT_VIEW, conversion program 108 may replace all instances of OLTP.DEPT_A with LIVE_ARCHIVE.DEPT_A. The resulting SQL statement associated with OLTP.DEPT_VIEW then would be "SELECT * FROM LIVE_ARCHIVE.DEPT_A, LIVE_ARCHIVE.DEPT_B WHERE LIVE_ARCHIVE.DEPT_A.NUM=LIVE_ARCHIVE.DEPT_B.NUM".

Determining Whether to Copy/Move Configuration Data

Referring to FIG. 1A, some of tables 114 may comprise transactional data, and some of tables 114 may comprise configuration data. Transactional data is the class of data that may change with each database transaction initiated by application 102. Transactional data is the class of data on which database transactions operate. For example, in response to events triggered by a user's actions, application 102 may issue database commands that cause information items to be inserted into one or more of tables 114. Those information items are considered to be transactional data. Over time, transactional data tends to grow.

In contrast, configuration data is relatively static. Configuration data is the class of data that typically does not change with each transaction initiated by application 102. For example, configuration data may include enumerated type definitions. For a more specific example, configuration data might include a "state" type definition. The configuration data might indicate the names of fifty different states in the United States of America; the values that an information item's "state" type attribute might possibly assume. The names of these states typically do not change in response to database transactions.

When preparing results of a transaction, database server 104 may refer to tables that contain transactional data ("transactional data tables") and tables that contain configuration data ("configuration data tables"). For example, an information item might contain a value of "44" for a "state" type attribute of that information item. By referring to a configuration data table that defines the possible values of the "state" type, database server 104 may determine that "44" corresponds to "Utah". In transaction results that contain the information item, database server 104 may replace "44" with "Utah".

If all or some of the information items in a transactional data table are moved to a repository other than the repository that stores configuration data to which the information items refer, then database server 104 may need to access multiple repositories in order to prepare transactional results. For example, if most of the information items containing the "state" type attribute are stored in database 106A, but the configuration data defining the possible values of the "state" type is stored in database 106B, then database server 104 might need to refer very frequently to both database 106A and database 106B. When a database server is required to perform a non-local join operation to obtain transaction results, a performance penalty is incurred.

In order to boost performance, a technique may be employed wherein database access characteristics are monitored and evaluated. Based on the access characteristics, a determination may be made, for each of one or more configuration data tables, whether to copy or move that configuration data table from one repository to another. This allows the join operation between the transactional data and the configuration data to be performed locally. For example, conversion program 108 or some other program in accordance with an embodiment of the invention may perform such a technique automatically.

For example, a program may monitor how frequently a particular configuration data table in database 106A is accessed in conjunction with accesses of transactional data tables in database 106A, and how frequently the particular configuration data table is accessed in conjunction with accesses of transactional data tables in database 106B. If the program determines that the particular configuration data table is accessed in conjunction with accesses of transactional data tables 106B more frequently than the particular configuration data table is accessed in conjunction with accesses of transactional data tables 106A, then the program may copy or move the particular configuration data table to database 106B in order to boost performance. The program may make such a determination at specified time intervals. The program may make a separate determination for each separate configuration data table.

FIG. 3 is a flow diagram that illustrates a technique 300 for selectively copying or moving configuration data tables from one repository to another repository, according to one embodiment of the invention. Technique 300 may be performed to enhance the performance of join operations between transactional data and configuration data; however, technique 300 is optional. In block 302, a first frequency, with which a particular configuration data table in a first repository is accessed in conjunction with accesses of transactional data tables in the first repository, is determined. In block 304, a second frequency, with which the particular configuration data table is accessed in conjunction with accesses of transactional data tables in a second repository, is determined. In block 306, it is determined whether the second frequency is greater than the first frequency. If the second frequency is greater than the first frequency, then control passes to block 308. Otherwise, control passes to block 310.

In block 308, the particular configuration data table is moved or copied from the first repository to the second repository. When a configuration data table is moved from the first repository to the second repository, an alias referring to the configuration data table in the second repository may be created in the first repository. Alternatively, schema objects in the first repository may be modified, as described above, to refer to the identifier of the configuration data table in the second repository instead of the identifier of the configuration data table formerly contained in the first repository.

If it is determined, in block 306, that the second frequency is not greater than the first frequency, then, in block 310, the particular configuration table is maintained in the first repository. Technique 300 may be repetitively performed at specified time intervals, and for each configuration data table in the repository system.

Although the movement of a configuration table may be based on access frequencies, as described above, the movement may be based on other criteria instead of or in addition to such access frequencies.

Converting a Single Repository System into a Multiple Repository System

FIG. 4 is a flow diagram that illustrates a more detailed technique 400 for converting a single repository system into a multiple repository system that is manifested as a single repository system, according to one embodiment of the invention. While one embodiment of the invention involves the creation of aliases for tables that are moved entirely from one database to another, technique 400 instead performs text substitutions in SQL statements under circumstances in which an entire table is moved, as described above in the section titled "CONVERTING EXISTING VIEWS AND EXISTING STORED PROCEDURES". Technique 400 may be performed for each of tables 114 in FIG. 1A. The conversion process performed by technique 400 does not need to be performed more than once.

In block 402, it is determined whether a particular table is a transactional data table. For example, conversion program 108 may determine, from information contained in ATT document 110, whether the particular table is a transactional data table or a configuration data table. If the particular table is a transactional data table, then control passes to block 404. Otherwise, technique 400 ends with regard to the particular table.

In block 404, it is determined whether the multiple repositories are only logical repositories. As described above, repositories may be both physical and logical, as in the case of databases 106A and 106B in FIG. 1B, or repositories may be only logical, as in the case of logical repositories 126A and 126B in FIG. 1C. For example, conversion program 108 may determine, from information contained in partition map 130, whether the multiple repositories are only logical repositories. If the multiple repositories are only logical, then control passes to block 406. Otherwise, control passes to block 410.

In block 406, in each of the multiple repositories other than the repository that originally contains the particular table (the "original repository"), a new table is created that can store the information items stored in the particular table. For example, conversion program 108 may determine, from information contained in partition map 130, how many repositories are in the multiple repository system. In each of these repositories other than the original repository, conversion program 108 may create a new table that is formatted in such a way that the new table can store information items having the same attribute types as the information items stored in the particular table.

At that time, information items do not need to be moved from the particular table to any of the new tables. At a later time, information items may be moved to one or more of the new tables during the performance of techniques disclosed in co-pending application Ser. No. 10/734,705, entitled "TYPE-SPECIFIC METADATA FOR ACTIVE/INACTIVE REPOSITORY SYSTEM". Thus, the new tables initially may be empty containers.

In block 408, a view is created in the original repository. The view is associated with the same identifier as the particular table. The view is associated with a SQL statement that performs a "union all" operation between information items in the particular table and information items in each of the new tables. For example, assuming the existence of an original table OLTP.EMP and one new table LIVE_ARCHIVE.EMP in a repository LIVE_ARCHIVE, conversion program 108 may issue, to database server 104, a command such as "CREATE VIEW OLTP.EMP AS SELECT * FROM OLTP.EMP UNION ALL SELECT * FROM LIVE_ARCHIVE.EMP". This command causes a view OLTP.EMP to be created. The view OLTP.EMP is a "union all" of information items in table OLTP.EMP and information items in table LIVE_ARCHIVE.EMP.

In one embodiment, the identifier of the original table is preserved. In an alternative embodiment, a new and different identifier is associated with the original table to distinguish the original table's identifier from the view's identifier. In such an alternative embodiment, the "union all" SQL statement associated with the view refers to the original table by the new identifier.

In the case where the multiple repositories are only logical repositories, text substitution does not need to be performed, and, subsequent to block 408, technique 400 ends with regard to the particular table. However, in the case where the multiple repositories are not only logical (i.e., where the multiple repositories are physical repositories as well), control passes from block 404 to block 410.

In block 410, in a repository other than the original repository, a new table is created that can store the information items stored in the particular table. For example, assuming that the original repository is database 106A, conversion program 108 may create, in database 106B, a new table that is formatted in such a way that the new table can store information items having the same attribute types as the information items stored in the particular table. The new table is associated with an identifier that is different than the particular table's identifier.

In block 412, information items in the particular table are moved to the new table. For example, assuming that the particular table is a table OLTP.EMP and the new table is a table LIVE_ARCHIVE.EMP in a repository LIVE_ARCHIVE, conversion program 108 may move all information items stored in table OLTP.EMP to table LIVE_ARCHIVE.EMP. Once all of the information items have been moved out of table OLTP.EMP, conversion program 108 may cause table OLTP.EMP to be dropped from the original repository.

In block 414, a set of schema objects that are associated with SQL statements that refer to the particular table's identifier is determined. Continuing the above example, conversion program 108 may determine, from information contained in database 106A, which of schema objects 112 are associated with SQL statements that contain at least one reference to table OLTP.EMP. Schema objects that are associated with SQL statements that contain at least one reference to the particular table's identifier may include one or more of views 116 and/or one or more of stored procedures 118.

In block 416, for each schema object that is associated with a SQL statement that refers to the particular table's identifier, each instance of the particular table's identifier is replaced, in that schema object's SQL statement, with the new table's identifier. Continuing the above example, conversion program 108 may replace each instance of "OLTP.EMP" in SQL statements associated with schema objects identified in block 414 with an instance of "LIVE_ARCHIVE.EMP". As a result, all those of schema objects 112 that formerly referred to table OLTP.EMP refer instead to table LIVE_ARCHIVE.EMP. Subsequent to block 416, technique 400 ends relative to the particular table.

Hardware Overview

Figure 5:
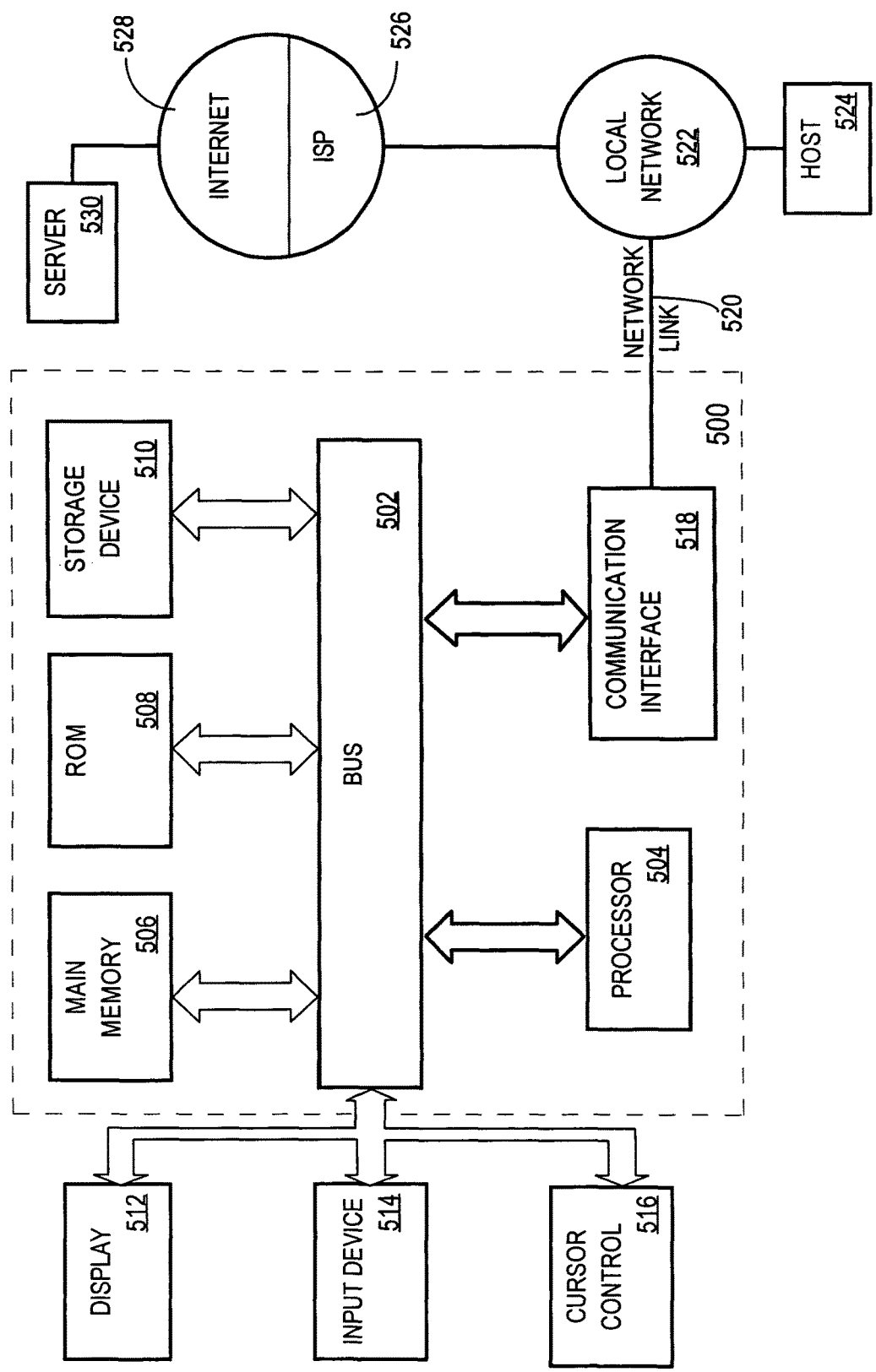
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for selectively copying a configuration data table from one repository to another, different repository comprising:
   determining, by a system including a processor, a frequency of first accesses of a particular configuration data table, wherein said first accesses occur in connection with accesses of one or more transactional data tables that are contained in a first repository that contains the particular configuration data table;
   determining, by the system, a frequency of second accesses of the particular configuration data table, wherein said second accesses occur in connection with accesses of one or more transactional data tables that are contained in a second repository that does not contain the particular configuration data table; and
   in response to determining that the frequency of second accesses exceeds the frequency of first accesses, copying, by the system, the particular configuration data table to the second repository.

2. The method of claim 1, wherein the particular configuration data table contains data that does not change with a transaction associated with either the first accesses or the second accesses.

3. The method of claim 2, wherein the one or more transactional data tables contained in the first repository and the one or more transactional data tables contained in the second repository contain data that can change with the transaction.

4. The method of claim 1, wherein the one or more transactional data tables in the first repository and the one or more transactional data tables in the second repository each contain values that are defined in the particular configuration data table.

5. The method of claim 1, further comprising repeating, at a specified time interval, the determining a frequency of first accesses of a particular configuration data table, the determining a frequency of second accesses of the particular configuration data table, and the copying the particular configuration data table to the second repository when the frequency of second accesses exceeds the frequency of first accesses.

6. The method of claim 1, wherein copying the particular configuration data table includes moving the particular configuration data table from the first repository to the second repository and providing a pointer in the first repository to point to the particular configuration data table in the second repository.

7. The method of claim 1, wherein copying the particular configuration data table includes modifying a schema object in the first repository to refer to an identifier of the particular configuration data table in the second repository instead of an identifier of the particular configuration data table when it was contained in the first repository.

8. The method of claim 7, further comprising, describing, in a schema object that is a logical table, a subset of information items stored in one or more of the particular configuration data table, the one or more transactional data tables in the first repository, and the one or more transactional data tables in the second repository.

9. The method of claim 8, further comprising describing the subset of information items in a manner that satisfies a Structured Query Language (SQL) statement.

10. The method of claim 1, further comprising manifesting, to an application that is designed to use a single repository, the first and second repositories as a single repository.

11. The method of claim 1, wherein the first repository is a first database and the second repository is a second database that is physically separated from the first database.

12. A multiple repository system that is manifested to an application as a single repository comprising:
   a first repository that contains a particular configuration data table and one or more first transactional data tables;
   a second repository that contains one or more second transactional data tables and not the particular configuration data table; and
   at least one processor; and
   a non-transitory storage medium storing instructions executable on the at least one processor to:
      determine a frequency of first accesses of the particular configuration data table, wherein the first accesses occur in connection with accesses of the one or more first transactional data tables;
      determine a frequency of second accesses of the particular configuration data table, wherein the second accesses occur in connection with accesses of the one or more second transactional data tables; and
      in response to a determination that the frequency of second accesses exceeds the frequency of first accesses, copy the particular configuration data table to the second repository.

13. The system of claim 12 wherein, the one or more first transactional data tables and the one or more second transactional data tables each contain values that are defined in the particular configuration data table.

14. The system of claim 12 wherein, the at least one processor is to modify a schema object in the first repository to refer to an identifier of the particular configuration data table in the second repository instead of an identifier of the particular configuration data table when it was contained in the first repository.

15. The system of claim 14, wherein the schema object is a logical table that describes a subset of information items stored in one or more of the particular configuration data table, the one or more first transactional data tables, and the one or more second transactional data tables.

16. The system of claim 12, wherein the first repository is a first database and the second repository is a second database that is physically separated from the first database.

17. A non-transitory computer-readable storage medium comprising instructions that, when executed by a processor, cause the processor to:

determine a frequency of first accesses of a particular configuration data table, wherein said first accesses occur in connection with accesses of one or more transactional data tables that are contained in a first repository that contains the particular configuration data table;

determine a frequency of second accesses of the particular configuration data table, wherein said second accesses occur in connection with accesses of one or more transactional data tables that are contained in a second repository that does not contain the particular configuration data table; and in response to a determination that the frequency of second accesses exceeds the frequency of first accesses, copy the particular configuration data table to the second repository.

18. The non-transitory computer-readable storage medium of claim 17, wherein the non-transitory computer-readable storage medium further comprises instructions that, when executed by the processor, cause the processor to:

modify a schema object in the first repository to refer to an identifier of the particular configuration data table in the second repository instead of an identifier of the particular configuration data table when it was contained in the first repository.

19. The non-transitory computer-readable storage medium of claim 17, wherein the instructions, when executed by the processor, cause the processor to copy the particular configuration data table by moving the particular configuration data table from the first repository to the second repository and providing a pointer in the first repository to point to the particular configuration data table in the second repository.

20. The non-transitory computer-readable storage medium of claim 17, wherein the first repository is a first database and the second repository is a second database that is physically separated from the first database.

* * * * *